US012561364B2

(12) United States Patent
Klein et al.

(10) Patent No.: US 12,561,364 B2
(45) Date of Patent: Feb. 24, 2026

(54) FOOL-PROOFING PRODUCT IDENTIFICATION

(71) Applicant: Google LLC, Mountain View, CA (US)

(72) Inventors: Daniel V. Klein, Pittsburgh, PA (US); Igor Dos Santos Ramos, Round Rock, TX (US)

(73) Assignee: Google LLC, Mountain View, CA (US)

( * ) Notice: Subject to any disclaimer, the term of this patent is extended or adjusted under 35 U.S.C. 154(b) by 464 days.

(21) Appl. No.: 18/158,294

(22) Filed: Jan. 23, 2023

(65) Prior Publication Data

US 2023/0237091 A1     Jul. 27, 2023

Related U.S. Application Data

(60) Provisional application No. 63/267,141, filed on Jan. 25, 2022.

(51) Int. Cl.
G06F 16/583        (2019.01)
G06F 16/532        (2019.01)

(52) U.S. Cl.
CPC ........ G06F 16/5854 (2019.01); G06F 16/532 (2019.01); G06F 16/5846 (2019.01)

(58) Field of Classification Search
None
See application file for complete search history.

(56) References Cited

U.S. PATENT DOCUMENTS

| | | | |
|---|---|---|---|
| 2009/0109243 A1 | 4/2009 | Kraft et al. | |
| 2016/0091964 A1 | 3/2016 | Iyer et al. | |
| 2018/0267994 A1 | 9/2018 | Badr et al. | |

(Continued)

FOREIGN PATENT DOCUMENTS

| | | | |
|---|---|---|---|
| JP | 2019056956 A | 4/2019 | |
| WO | 2020033747 A1 | 2/2020 | |

OTHER PUBLICATIONS

Chen, Chao—"On-device Supermarket Product Recognition", <https://al.googleblog.com/2020/07/on-device-supermarket-product.html> vice-supermarket-product.html <https://ai.googleblog.com/2020/07/on-device-supermarket-product.html> initiatives/accessibility/lookout-updates/> , Published on Aug. 11, 2020.

(Continued)

*Primary Examiner* — Bernard Krasnic
(74) *Attorney, Agent, or Firm* — Honigman LLP; Brett A. Krueger; Grant Griffith

(57)        ABSTRACT
A method includes receiving, from an image capture device in communication with the data processing hardware, image data for an area of interest of a user. The method also includes receiving a query from the user referring to one or more objects detected within the image data and requesting a digital assistant to discern insights associated with the one or more objects referred to by the query. The method also includes processing the query and the image data to: identify, based on context data extracted from the image data, the one or more objects referred to by the query; and determine the insights associated with the identified one or more objects for the digital assistant to discern. The method also includes generating, for output from a user device associated with the user, content indicating the discerned insights associated with the identified one or more objects.

26 Claims, 7 Drawing Sheets

(56)            References Cited

U.S. PATENT DOCUMENTS

| | | | |
|---|---|---|---|
| 2018/0336009 A1* | 11/2018 | Yoganandan | ....... G06F 3/04845 |
| 2019/0025909 A1 | 1/2019 | Mittal et al. | |
| 2019/0027147 A1* | 1/2019 | Diamant | ................. G10L 15/22 |
| 2020/0021740 A1 | 1/2020 | Badr et al. | |
| 2020/0302510 A1 | 9/2020 | Chachek et al. | |
| 2021/0118442 A1* | 4/2021 | Poddar | .................... G10L 15/32 |
| 2022/0156312 A1* | 5/2022 | Nagpal | ............... G06F 16/5866 |

OTHER PUBLICATIONS

International Search Report and Written Opinion for the related Application No. PCT/US2023/061102, dated Apr. 25, 2023, 53 pages.
Japanese Office Action for the related Application No. 2024-544493 dated Sep. 30, 2025.

\* cited by examiner

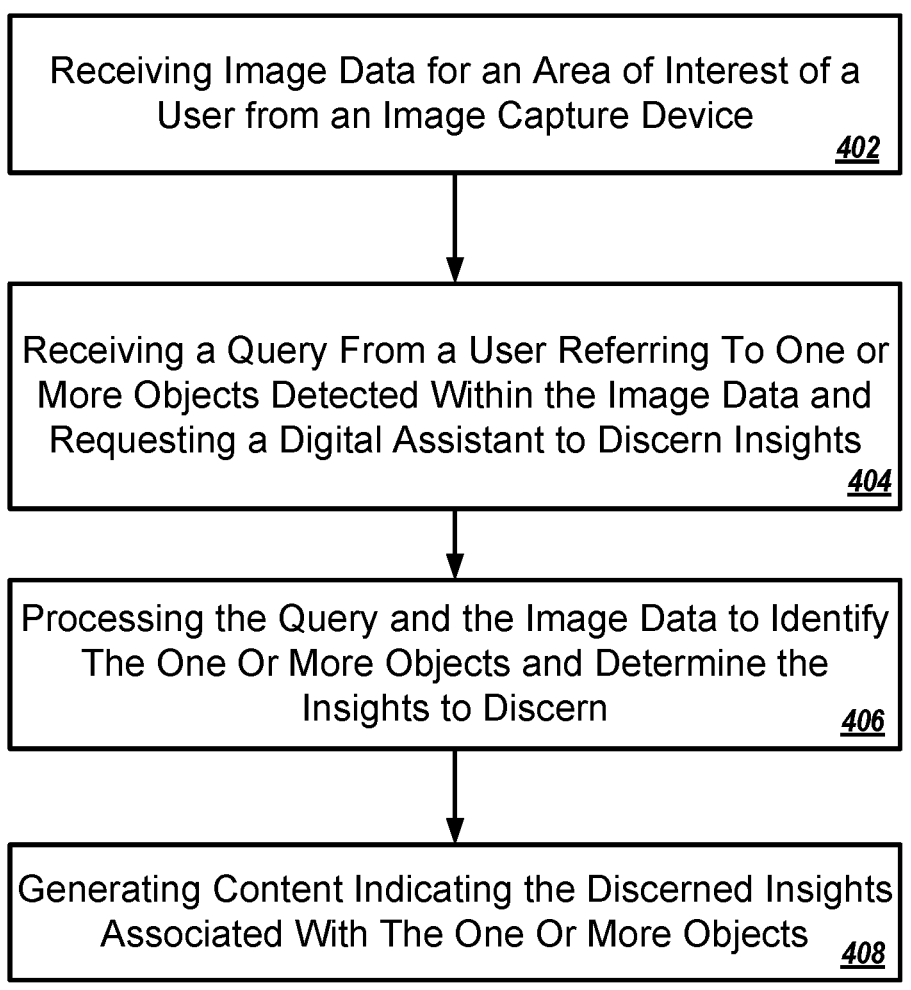

400

Receiving Image Data for an Area of Interest of a User from an Image Capture Device 402

Receiving a Query From a User Referring To One or More Objects Detected Within the Image Data and Requesting a Digital Assistant to Discern Insights 404

Processing the Query and the Image Data to Identify The One Or More Objects and Determine the Insights to Discern 406

Generating Content Indicating the Discerned Insights Associated With The One Or More Objects 408

FIG. 4

FOOL-PROOFING PRODUCT IDENTIFICATION

CROSS REFERENCE TO RELATED APPLICATIONS

This U.S. patent application is a continuation of, and claims priority under 35 U.S.C. § 119(e) to U.S. Provisional Application 63/267,141, filed on Jan. 25, 2022. The disclosures of this prior application is considered part of the disclosure of this application and is hereby incorporated by reference in its entirety.

TECHNICAL FIELD

This disclosure relates to fool-proofing product identification.

BACKGROUND

Product packaging often does a less than adequate job of clearly defining what the product is and/or what the product is used for. This can be the result of the use of small letters and/or obscure names used to describe or distinguish the product from a collection of different products that use nearly-identical packaging. For instance, a company may use a same type of bottle for each of its shampoo and conditioner products where the two products have practically identical labels except for the difference of one difficult to read term, e.g., shampoo or conditioner. A similar scenario occurs in restrooms where soap and lotion are positioned next to a sink and packaged in identical bottles where the text labels that would otherwise distinguish the two products from one another are worn out.

SUMMARY

One aspect of the disclosure provides a computer-implemented method for fool-proofing product identification. The computer-implemented method that when executed on data processing hardware causes the data processing hardware to perform operations that include receiving, from an image capture device in communication with the data processing hardware, image data for an area of interest of a user. The operations further include receiving a query from the user referring to one or more objects detected within the image data and requesting a digital assistant to discern insights associated with the one or more objects referred to by the query. The operations include processing the query and the image data to: identify, based on context data extracted from the image data, the one or more objects referred to by the query and determine the insights associated with the identified one or more objects for the digital assistant to discern. The operations further include generating, for output from a user device associated with the user, content indicating the discerned insights associated with the identified one or more objects.

Implementations of the disclosure may include one or more of the following optional features. In some implementations, the query refers to, but does not explicitly identify, the one or more objects associated with the insights the digital assistant is requested to discern. In other implementations, the context data extracted from the image data includes a hand of the user recognized within the image data. In these implementations, processing the query and the image data to identify the one or more objects includes processing the query and the image data to identify the one or more objects based on a proximity of the hand of the user recognized within the image data to at least one of the one or more objects detected within the image data.

In some implementations, the context data extracted from the image data includes a point of focus of the image capture device. In these implementations, processing the query and the image data to identify the one or more objects referred to by the query includes processing the query and the image data to identify the one or more objects based on locations of the one or more objects detected within the image data relative to the point of focus of the image capture device.

In other implementations, processing the query and the image data to identify the one or more objects associated with the insights includes performing query interpretation on the received query to identify one or more terms conveying a descriptor of the one or more objects referred to by the query. These implementations further include extracting visual features from the received image data to obtain object recognition results and determining an association between one or more of the object recognition results and the descriptor of the one or more objects. These implementations also include, identifying the one or more objects referred to by the query based on the association between one or more of the object recognition results and the descriptor of the one or more objects.

The operations may further include extracting textual features from the received image data and combining the textual features extracted from the received image data with the visual features extracted from the received image data to obtain the object recognition results. The descriptor conveyed by the one or more terms identified by performing the query interpretation on the received query may include at least one of an object category associated with the one or more objects, a physical trait associated with the one or more objects, or a location of the one or more objects relative to reference object in the field of view of the image data.

Processing the query and the image data to determine the insights associated with the identified one or more objects for the digital assistant to discern may include performing query interpretation on the received query to identify a type of the insight for the digital assistant to discern. In some implementations, the type of insight identified for the digital assistant to discern includes at least one of an insight to uniquely identify a single object, an insight to identify multiple related objects, an insight to obtain additional information about an object, an insight to provide personalized information about an object, an insight to distinguish between two or more objects, or an insight to enhance available information.

In some implementations the operations further include after processing the query and the image data to identify the one or more objects and determine the insights associated with the identified one or more objects for the digital assistant to discern performing one or more operations to discern the insights associated with the identified one or more objects, wherein generating content indicating the discerned insights associated with the identified one or more objects is based on the one or more operations performed to discern the insights.

Performing the one or more operations to discern the insights may include at least one of extracting, from the image data, textual features containing detailed product information associated with at least one of the identified one or more objects, extracting, from the image data, textual features containing an object identifier that uniquely identifies at least one of the identified one or more objects, retrieving search results containing product information associated with at least one of the identified one or more objects, retrieving textual data containing product information associated with at least one of the identified one or more objects, the textual data uploaded by a merchant, retrieving personal information associated with at least one of the identified one or more objects, or retrieving custom information associated with at least one of the identified one or more objects.

In some implementations, generating content indicating the discerned insights includes generating graphical content that indicates the discerned insights. In these implementations, the graphical content is superimposed in a graphical user interface displayed on a screen of the user device. In other implementations, generating content indicating the discerned insights includes generating audible content indicating the discerned insights. In these other implementations, the audible content is audibly output from the user device.

The operations may further include executing a personalized training process to train a visual feature recognizer on training samples to teach the visual feature recognizer to learn to uniquely identify particular objects, each training sample including training image data representing one of the particular objects and a corresponding ground-truth label uniquely identifying the particular object. Alternatively, the operations may further include executing a training process to train a content generator on training samples to teach the content generator to learn to generate personalized graphical content when particular objects are uniquely identified in image data, each training sample including data representing the personalized graphical content to generate and a corresponding ground-truth label uniquely identifying a particular object.

Another aspect of the disclosure provides a system for fool-proofing product identification. The system includes data processing hardware and memory hardware in communication with the data processing hardware. The memory hardware stores instructions that when executed on the data processing hardware cause the data processing hardware to perform operations. The operations include receiving, from an image capture device in communication with the data processing hardware, image data for an area of interest of a user. The operations further include receiving a query from the user referring to one or more objects detected within the image data and requesting a digital assistant to discern insights associated with the one or more objects referred to by the query. The operations include processing the query and the image data to: identify, based on context data extracted from the image data, the one or more objects referred to by the query and determine the insights associated with the identified one or more objects for the digital assistant to discern. The operations further include generating, for output from a user device associated with the user, content indicating the discerned insights associated with the identified one or more objects.

This aspect may include one or more of the following optional features. In some implementations, the query refers to, but does not explicitly identify, the one or more objects associated with the insights the digital assistant is requested to discern. In other implementations, the context data extracted from the image data includes a hand of the user recognized within the image data. In these implementations, processing the query and the image data to identify the one or more objects includes processing the query and the image data to identify the one or more objects based on a proximity of the hand of the user recognized within the image data to at least one of the one or more objects detected within the image data.

In some implementations, the context data extracted from the image data includes a point of focus of the image capture device. In these implementations, processing the query and the image data to identify the one or more objects referred to by the query includes processing the query and the image data to identify the one or more objects based on locations of the one or more objects detected within the image data relative to the point of focus of the image capture device.

In other implementations, processing the query and the image data to identify the one or more objects associated with the insights includes performing query interpretation on the received query to identify one or more terms conveying a descriptor of the one or more objects referred to by the query. These implementations further include extracting visual features from the received image data to obtain object recognition results and determining an association between one or more of the object recognition results and the descriptor of the one or more objects. These implementations also include, identifying the one or more objects referred to by the query based on the association between one or more of the object recognition results and the descriptor of the one or more objects.

The operations may further include extracting textual features from the received image data and combining the textual features extracted from the received image data with the visual features extracted from the received image data to obtain the object recognition results. The descriptor conveyed by the one or more terms identified by performing the query interpretation on the received query may include at least one of an object category associated with the one or more objects, a physical trait associated with the one or more objects, or a location of the one or more objects relative to reference object in the field of view of the image data.

Processing the query and the image data to determine the insights associated with the identified one or more objects for the digital assistant to discern may include performing query interpretation on the received query to identify a type of the insight for the digital assistant to discern. In some implementations, the type of insight identified for the digital assistant to discern includes at least one of an insight to uniquely identify a single object, an insight to identify multiple related objects, an insight to obtain additional information about an object, an insight to provide personalized information about an object, an insight to distinguish between two or more objects, or an insight to enhance available information.

In some implementations the operations further include after processing the query and the image data to identify the one or more objects and determine the insights associated with the identified one or more objects for the digital assistant to discern performing one or more operations to discern the insights associated with the identified one or more objects, wherein generating content indicating the discerned insights associated with the identified one or more objects is based on the one or more operations performed to discern the insights.

Performing the one or more operations to discern the insights may include at least one of extracting, from the image data, textual features containing detailed product information associated with at least one of the identified one or more objects, extracting, from the image data, textual features containing an object identifier that uniquely identifies at least one of the identified one or more objects, retrieving search results containing product information associated with at least one of the identified one or more objects, retrieving textual data containing product information associated with at least one of the identified one or more objects, the textual data uploaded by a merchant, retrieving personal information associated with at least one of the identified one or more objects, or retrieving custom information associated with at least one of the identified one or more objects.

In some implementations, generating content indicating the discerned insights includes generating graphical content that indicates the discerned insights. In these implementations, the graphical content is superimposed in a graphical user interface displayed on a screen of the user device. In other implementations, generating content indicating the discerned insights includes generating audible content indicating the discerned insights. In these other implementations, the audible content is audibly output from the user device.

The operations may further include executing a personalized training process to train a visual feature recognizer on training samples to teach the visual feature recognizer to learn to uniquely identify particular objects, each training sample including training image data representing one of the particular objects and a corresponding ground-truth label uniquely identifying the particular object. Alternatively, the operations may further include executing a training process to train a content generator on training samples to teach the content generator to learn to generate personalized graphical content when particular objects are uniquely identified in image data, each training sample including data representing the personalized graphical content to generate and a corresponding ground-truth label uniquely identifying a particular object.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4 is a flowchart of an example arrangement of operations for a method of discerning insights associated with one or more objects detected in image data.

Like reference symbols in the various drawings indicate like elements.

DETAILED DESCRIPTION

Figure 1:
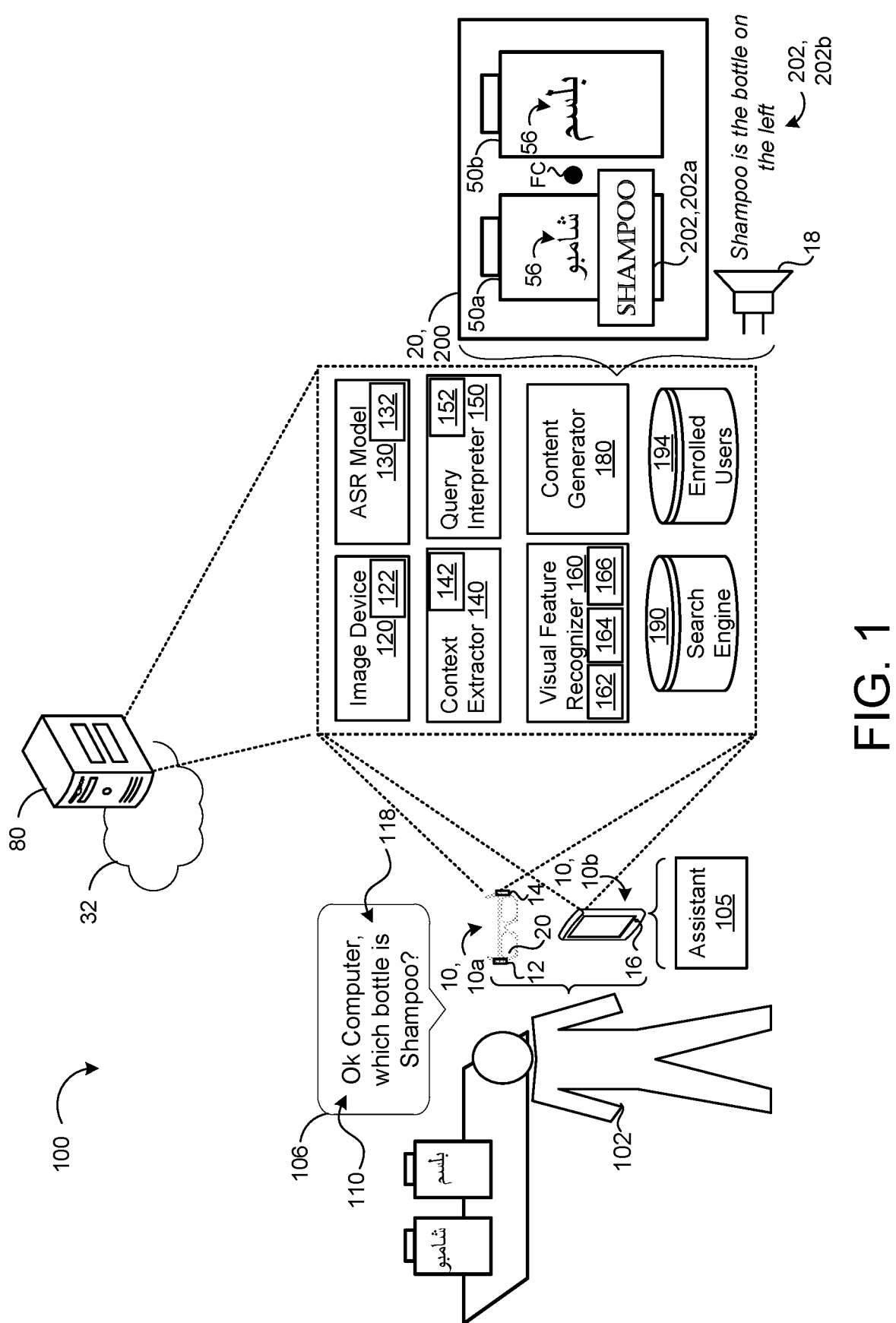
FIG. 1 is a schematic view of an example system for discerning insights associated with one or more objects detected in image data.

Product packaging often does a less than adequate job of clearly defining what the product is and/or what the product is used for. This can be the result of the use of small letters and/or obscure names used to describe or distinguish the product from a collection of different products that use nearly-identical packaging. For instance, a company may use a same type of bottle for each of its shampoo and conditioner products where the two products have practically identical labels except for the difference of one difficult to read term, e.g., shampoo or conditioner. This issue can be compounded when the distinguishing terms on the labels are in a foreign language. A similar scenario occurs in restrooms where soap and lotion are positioned next to a sink and packaged in identical bottles where the text labels that would otherwise distinguish the two products from one another are worn out.

Implementations herein are directed toward generating augmented reality (AR) content to a user device associated with a user to convey discerned insights associated with one or more objects within a field of view of an image capturing device. As will become apparent, the insights for particular objects conveyed by AR content can be used to not only provide detailed information about products represented by objects recognized in image data, but also to distinguish between similarly-packaged products that are otherwise difficult to distinguish from one another without a close inspection. Advantageously, the use of AR content can similarly be adapted to distinguish different objects from one another to a child who cannot read by overlaying simple graphical elements over the objects to convey the necessary information to the child about the objects. For instance, for similarly sized and shaped tubes of toothpaste and triple antibiotic ointment positioned next to one another within a field of view, AR content may be generated to provide an AR view on a display of the user device that overlays a warning graphic over the tube of triple antibiotic ointment intended to convey to the child that the triple antibiotic ointment is not for the child to use. In this example, the AR content generated may similarly overlay an encouraging/welcoming graphic over the tube of toothpaste intended to convey to the child that the tube includes toothpaste for the child to use to brush his/her teeth.

More specifically, implementations herein are directed toward allowing a user to interact with a digital assistant via a user device to issue a voice query that refers to one or more objects detected in image data captured by an image capture device and that requests the digital assistant to discern insights related to the objects referred to by the query. The image capture device may reside on the user device and the digital assistant may execute on the user device and/or a remote computing device (e.g., cloud-based server) in communication with the user device. Notably, the user may speak the voice query and a microphone of the user device may capture the voice query in streaming audio, whereby the user device, or the remote computing device (e.g., cloud-based server), may perform speech recognition on the audio data characterizing to provide a textual representation (i.e., transcription) of the voice query. Notably, the user is free to issue voice queries directed toward the digital assistant in a natural way as if the user were speaking to another human. However, naturally speaking voice queries in such a conversational manner often results in the digital assistant receiving ambiguous queries that are missing parameters necessary to uniquely identify the one or more objects associated with the insights to discern as well uniquely identify the scope of the insights to discern. For instance, the user could issue the voice query directed toward the digital assistant that states "What are these?" when the captured image data includes two identical bottles except a respective label on one of the bottles identifies the bottle as conditioner and a respective label on the other one of the bottles identifies the bottle as shampoo. As will be described in greater detail below, in order for the digital assistant to disambiguate these naturally spoken queries, the digital assistant may process the query and the image data in order to both identify the one or more objects referred to by the query and discern the insights associated with the identified one or objects. Using the above example, the digital assistant may extract context data from the image data in order to identify the one or more objects referred to by a query. Here, the extracted context data may include a point of focus of the image (e.g., focal point) capture device such that two objects detected in the image data relative to the point of focus may be identified as the two bottles the query referred to. The extracted context data could also include a hand of the user recognized in the image data that serves as a reference object such that the two objects detected in the image data proximate to the hand of the user may be identified as the two bottles the query referred to. For example, the user may use his/her hand to grasp, point, or convey some other gesture indicating that the user is referring to the two identical bottles at the time of speaking the phrase "What are these?".

FIG. 1 illustrates an example system 100 for discerning insights associated with objects 50 detected in image data 122 and generating, for output from a user device 10, content 202 indicating the discerned insights to a user 102. Briefly, and as described in more detail below, the user device 10 may be an assistant-enabled device configured to capture an utterance 106, "Ok computer, which bottle is shampoo," spoken by the user 102 that invokes a digital assistant 105 to discern insights associated with one or more objects detected within image data 122 for an area of interest of the user 102. In this example, two objects 50a, 50b detected within the image data 122 represent two substantially identical bottles except for their respective labels having different text in a foreign language that the user 102 is unable to read. Using the query 118 and the image data 122, the digital assistant 105 may identify the two objects 50a, 50b as one of two bottles/products the user 102 is unable to discern as shampoo, and thereby recognize the textual labels in the image data to discern the insights by distinguishing the two objects 50 to determine which one of the bottles is shampoo.

After discerning the insights by determining that the object 50a includes the bottle of shampoo, the digital assistant 105 generates, for output from the user device 10, content 202 indicating the discerned insights associated with the identified one or more objects 50. For instance, the content 202 may include augmented reality (AR)-based graphical content 202a such as graphical elements superimposed in a graphical user interface (GUI) 200 displayed on a screen 20 of the user device 10. Here, the GUI 200 is presenting real-time image data 122 representing the area of interest and the graphical content 202a superimposed in the GUI 200 may be overlain upon/around/proximate one or more of the identified objects 50 to convey the insights discerned by the digital assistant 105. In the example, the graphical content 202a superimposed in the GUI 200 may be overlain upon the object 50a to indicate the discerned insight that the object 50a includes the bottle of shampoo. Here, the graphical content 202a overlain over the object 50a may include text in the native language of the user 102 that conveys the name of the product (e.g., shampoo) associated with the object 50a. While not shown in the example, the digital assistant 105 may also superimpose graphical content 202a over the other object 50b that indicates the other object 50b includes hair conditioner to better inform the user 102 and distinguish the two bottles 50a, 50b of shampoo and conditioner apart from one another.

Additionally or alternatively, the content 202 generated by the digital assistant 105 for output from the user device 10 may include content 202b audibly output from the user device 10 to indicate the discerned insights. For instance, the content 202b may include synthesized speech (e.g., "Shampoo is the bottle on the left") audibly output from an acoustic speaker 18 of the user device 10. In other examples, the audible content 202b may be any audio sound (e.g., an alarm if the user 102 asks if a product is safe to drink when the discerned insight indicates the product is poisonous).

The system 100 shows the user device 10 as an assistant-enabled device executing the digital assistant 105 that the user 102 may interact with through speech. The user device 10 may include smart glasses 10a or a headset worn by the user 102 or another computing device 10b such as a smart phone or tablet. The user device 10 can include other computing devices, such as, without limitation, a smart display, desktop/laptop, smart watch, smart appliance, heads-up display, or smart vehicle windscreen. The user device 102 includes data processing hardware 12 and memory hardware 14 storing instructions that when executed on the data processing hardware 12 cause the data processing hardware 12 to perform operations. The user device 102 also includes (or be in communication with) an array of one or more microphones 16 configured to capture acoustic sounds in streaming audio such as speech directed toward the user device 10.

The user device 10 also includes an image capture device (i.e., an array of one or more cameras) 120 configured to capture image data 122 associated with a continuous sequence of image frames for an area of interest of the user 102. The user device 10 also includes a display screen 20 configured to display the GUI 200 for presenting graphical content 202a indicating discerned insights associated with one or more objects 50 detected in the image data 122. When the user device 10 includes smart glasses 10a, the user 102 may view the natural scene through the lenses and the lenses may also integrate the display screen 20 to provide the GUI 200 for presenting graphical content 202 overlain upon natural scene to indicate discerned insights associated with one or more objects viewable in the natural scene.

In some examples, the user device 10 includes two or more user devices 10a, 10b paired with one another to provide shared-functionality in a distributed fashion. For instance, the image capture device 120 and the display screen 20 may reside on the smart glasses 10a worn by the user 102 to capture the image data 122 and present the graphical content 202a, respectively, while the data processing hardware 12 and the memory hardware 14 may reside on the smart phone 102b for generating the graphical content 202a.

With continued reference to FIG. 1, the user 102 speaks the utterance 106, "Ok computer, which bottle is shampoo?" in the vicinity of the user device 10 and the microphone 16 of the user device 10 captures the utterance 106 in streaming audio and processes the audio data characterizing utterance 106. The initial processing of the audio data may involve filtering the audio data and converting the audio data from an analog signal to a digital signal. As the user device 10 processes the audio data, the user device 10 may store the audio data in a buffer of the memory hardware 14 for additional processing. With the audio data in the buffer, the user device may use a hotword detector (not shown) to detect whether the audio data includes the hotword. The hotword detector is configured to identify hotwords 110 that are included in the audio data without performing speech recognition on the audio data. In this example, the hotword detector may determine that the utterance 106 "Ok computer, which bottle is shampoo?" includes the hotword 110 "ok computer" if the hotword detector detects acoustic features in the audio data that are characteristic of the hotword 110.

When the hotword detector determines that the audio data that corresponds to the utterance 106 includes the hotword 110, the user device 10 may trigger a wake-up process to initiate speech recognition on the audio data that corresponds to the utterance 106. For example, an automated speech recognition (ASR) model 130 running on the user device 10 may perform speech recognition on the audio data characterizing the utterance 106. The ASR model 130 may perform speech recognition on the portion of the audio data that follows the hotword 110. In this example, the ASR model 130 may recognize the phrase "which bottle is shampoo" as a query 118 that refers to one or more objects 50 detected within the image data 122 and that requests the digital assistant 105 to discern insights (i.e., perform object classification to distinguish the objects from one another) associated with the one or more objects 50 referred to by the query 118. As such, the ASR model 130 may generate a transcription 132 of the query 118.

In some implementations, the ASR model 130 is located on a server 80 in addition to, or in lieu, of the user device 10. Upon the hotword detector triggering the user device 10 to wake-up responsive to detecting the hotword 110 in the utterance 106, the user device 10 may transmit the audio data corresponding to the utterance 106 to the server 80 via a network 32. The server 80 may execute the ASR model 130 to perform speech recognition on the audio data and return the transcription 132 of the query 118 to the user device 10.

The user device 10 (or the server 80) may perform speaker identification (SID) on the audio data to identify the speaker of the utterance 106. For instance, the audio data may be processed to generate a speaker vector (e.g., a d-vector or an i-vector) characterizing the voice of the user that spoke the utterance 106. The SID performed may include text dependent SID (TD-SID) where SID is performed on a portion of audio data corresponding to a particular word or phrase, such as the predetermined hotword 110. Additionally or alternatively, the SID performed may include text independent SID (TI-SID) performed on the entire utterance 106 or the portion of the utterance 106 that includes the query 118. In TI-SID, the speaker vector is generated independent of what terms or phrases the user 102 spoke and may also be generated independent of the duration of the utterance 106.

The digital assistant 105 may have a plurality of enrolled users authorized to interact with the digital assistant 105. Here, the digital assistant 105 may execute on one user device 10 that each enrolled user uses to interact with the digital assistant 105 and/or the digital assistant 105 may operate on multiple user devices 10 each associated with a different enrolled user (e.g., each enrolled user may have their own pair of smart glasses 10a). In the case of the latter, SID may not be required since the digital assistant 105 may simply identify which enrolled user is speaking based on the user device 10 used to facilitate the interaction with the digital assistant. During an enrollment process, each enrolled user speaks one or more phrases and the digital assistant generates a respective reference speaker vector for that enrolled user and stores it in an enrolled user data store 194 as part of a user profile information. Later, when one of the enrolled users speaks an utterance 106 captured by the user device 10, SID may be performed to extract the speaker vector and compared with the reference speaker vectors stored in the enrolled user data store 194 to identify the particular enrolled user that spoke the utterance. The digital assistant 105 may use the identity of the speaker to tailor or customize how the insights are discerned, as well as tailor/customize the graphical and/or audible content 202 generated for output from the user device 10 to indicate the discerned insights about one or more objects 50. For instance, using the example above, suppose that the user 102 that spoke the query 118 ("which bottle is shampoo?") is identified as one of the enrolled users who is a child who cannot read. Here, the graphical content 202a overlain over the object 50a identified as shampoo may include a green halo, smiley face, or other encouraging graphic that conveys to the child that the object 50a is the bottle of shampoo. Additionally, additional graphical content 202a may be overlain over the other object 50b identified as conditioner where the additional graphical content may include a red "X", skull and cross bones, or other deterrent graphic that conveys to the child that the object 50b is not the bottle of shampoo. These same techniques could be adapted to convey which objects detected in a scene of a child user are safe for the child to use, and which are not. In such scenarios, allergy contents of particular foods could be identified and graphical content could be generated that conveys whether or not foods are safe for a child with specific allergic needs that are accessible in respective user profile information for the child stored in the enrolled user data store 194. As such, a child with a known dairy allergy could simply ask "can I eat these?" in a query 118 and an encouraging/welcoming graphical element can be generated as graphical content overlain over the food when the food does not contain dairy.

Notably, the user 102 may speak the query 118 directed toward the digital assistant 105 in a natural manner as if the user 102 were speaking to another human in the same environment as the user. Expressing queries 118 as natural speech often results in the queries 118 having ambiguity without additional context. For instance, the query 118 "which bottle is shampoo" merely refers to, but does not explicitly identify which particular objects 50 captured in the image data 122 are associated with the insights the query 118 is requesting the digital assistant 105 to discern. That is, without additional context, the digital assistant 105 has no way of ascertaining from the transcription 132 of the query 118 alone, whether the user 10 is referring to the two bottles 50a, 50b on the shelf in front of the user 102, multiple bottles in a pantry (not shown) proximate the user 102, or among bottles containing other liquids such as mouth wash and cleaning supplies located in a cabinet underneath the shelf.

Accordingly, in order to disambiguate the query 118 that is missing one or more parameters necessary for the digital assistant 105 to fulfill the query 118, implementations herein are directed toward the digital assistant 105 processing the query 118 (i.e., processing the transcription 132 of the query 118) and the image data 122 to uniquely identify the one or more objects 50 referred to by the query 118 and determine the insights associated with the identified one or more objects 50 for the digital assistant 105 to discern. The digital assistant 105 may collectively employ a context extractor 140, a query interpreter 150, and a visual feature recognizer 160 executing on the user device 10 or server 80 to process the query 118 and the image data 122 for disambiguating the query 118. Implementations herein may further facilitate user interface (UI) interactions such as the user tapping the user device 10 to invoke the ASR model 130 to perform speech recognition on subsequent speech spoken by the user 102. For instance, the user 102 could tap the side of smart glasses 10a proximate the user's temple to turn-on the microphone 16 for capturing subsequent speech for processing by the ASR model 130 without requiring the user 102 to speak a particular hotword. Additionally or alternatively, the user 102 could perform a predefined gesture, that when captured by the camera of the user device or other sensor, triggers the ASR model 130 to perform speech recognition on subsequent speech. Similarly, the user 102 could press a particular button on the user device 10 (e.g., the user could long press the power button on the user device 10) to trigger speech recognition. In some examples, the user device 10 could be a stationary device such as a kiosk where the user could press a button and/or simply step into the view of a camera to trigger speech recognition to be performed on speech spoken by the user 102.

The context extractor 140 is configured to extract, from the image data 122 captured by the image device 120, context data 142 that the digital assistant 105 may use to identify the one or more objects 50 in the image data 122 that were referred to by the query 118. In some implementations, the context data 142 extracted from the image data includes a point of focus of the image capture device 120, which may correspond to a focal point (FP) of the image data 122. As such, having context data 142 that ascertains the point of focus of the image capture device 120 conveys visual-based localization data indicating what objects the user was viewing, or more particularly what objects 50 the user was focusing the image capture device 120 on, when the user 102 spoke the utterance 106 containing the query 118.

The context extractor 140 may also obtain context data 142 in the form of user feedback provided by the user. For instance, if the digital assistant is unable to confidently identify which objects 50 referred to by the query 118, the assistant 105 may provide refining prompts for the user to answer. For instance, the digital assistant 105 could provide graphical refining prompts in the form of text and/or graphical indicators that prompt the user to confirm which objects are referred to (e.g., "are you inquiring about the two bottles on the shelf or the bottles scattered on the counter below the shelf?"). The user responding with "on the shelf" would serve as context data 142 informing which objects 50 should be identified as the subject of the query 118. Similarly, rather than providing refining prompts that require the user to speak an answer or select a graphic, the digital assistant 105 could instruct the user 102 to perform an action to assist the digital assistant 105 in better ascertaining the information from the object 50 as requested by the query. For instance, the digital assistant 105 could provide a refining prompt that instructs the user to rotate an object 50 such as a bottle so that the contents of the label can be captured by the camera, whereby the action of the user 102 rotating the bottle 50 so that the label is in view serves as context data 142 in the form of user feedback.

Figures 2A, 2B:
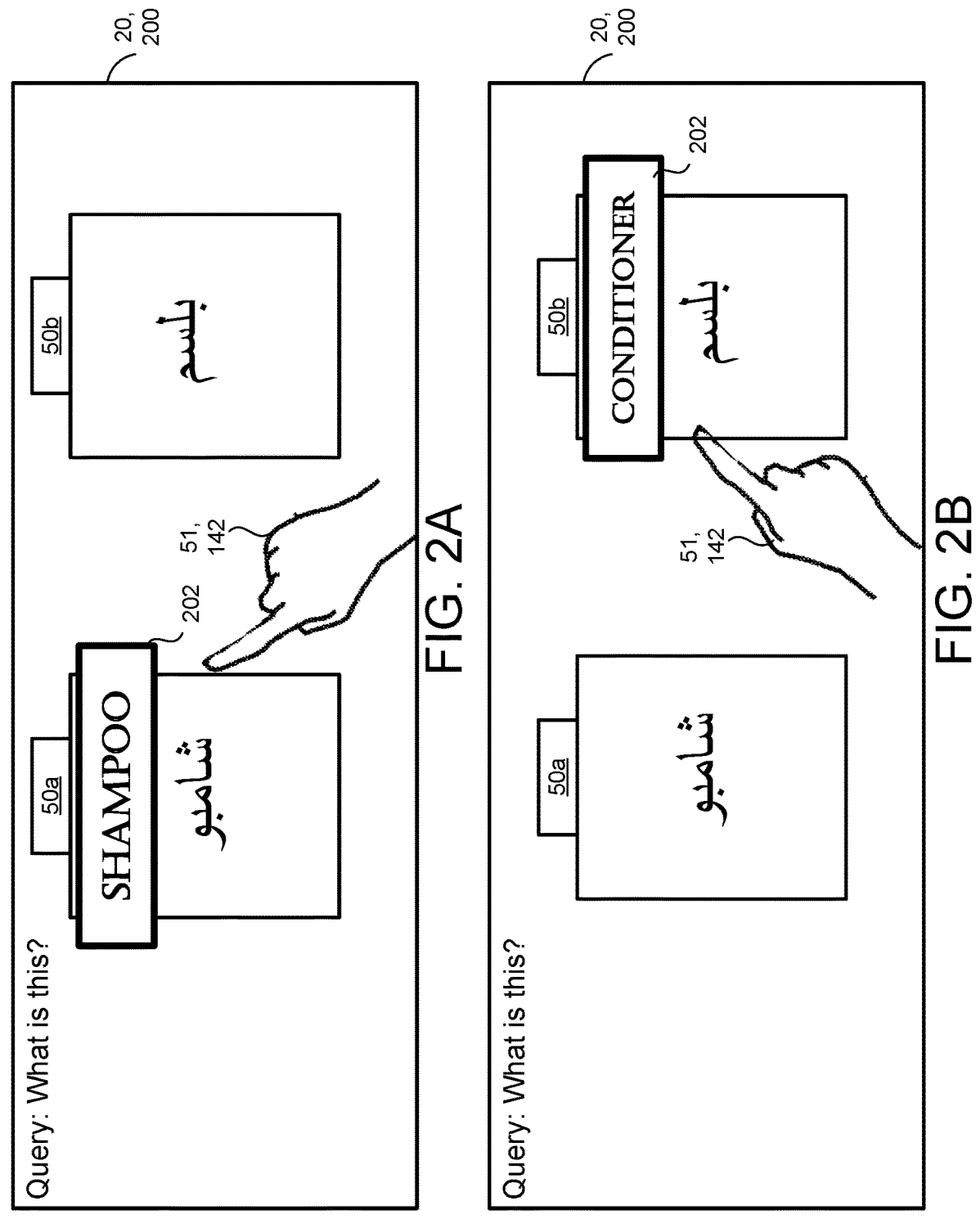
FIGS. 2A-2D are schematic views of example graphical user interfaces displaying graphical content indicating discerned insights associated with one or more objects detected in image data.

Referring to FIGS. 2A and 2B, in some additional implementations, the context data 142 extracted from the image data 122 includes a hand 51 of the user 102 recognized in the image data 122. The recognized hand 51 may be identified by the visual feature recognizer 160 based on visual features 162 (FIG. 1) extracted from the image data 122. Notably, the context data 142 including the hand 51 may correspond to a reference object for ascertaining another object 50 the query is referring to. FIGS. 2A and 2B show example GUIs 200 displayed on the screen 20 of the user device 10 and depicting the two objects 50a, 50b detected in the image data 122 of FIG. 1. The query 118 is more ambiguous than in the example of FIG. 1 by only stating "What is this?" without even giving a hint that the object the query 118 is referring to includes a bottle. FIG. 2A shows the user hand 51 pointing toward the first object 50a on the left. Here, the recognized hand 51 is extracted as context data 142 to bias the digital assistant 105 to identify that the query 118 is referring to the object 50a on the left based on the proximity (and/or orientation) of the hand 51 being closer to the object 50a on the left than the object 50b on the right. By contrast, the GUI 200 of FIG. 2B instead shows the hand 51 of the user 102 pointing toward the second object 50b on the right. Thus, the recognized hand 51 is extracted as context data 142 to bias the digital assistant 105 to identify the object 50b on the right based on the proximity (and/or orientation) of the hand 51 being closer to the object 50b on the right than the object 50a on the left.

Referring back to FIG. 1, in some implementations, the query interpreter 150 is configured to perform query interpretation (i.e., semantic interpretation) on the transcription 132 of the query 118 to identify one or more terms conveying a descriptor 152 of the one or more objects 50 referred to by the query. For instance, the descriptor 152 may include an object category (e.g., bottle, box, medicine container, spices, personal hygiene products, etc.) associated with the one or more objects, a physical trait (e.g., color, size/dimensions, shape, etc.) associated with the one or more objects 50, or a location of the one or more objects relative to a reference object (e.g., "what spice is that second from the last spice on the left") in the field of view of the image data. In some examples, the digital assistant 105 determines an association between the descriptor 152 and the context data 142 extracted from the image data 122. The query interpreter 150 may include a neural network trained using machine learning to identify terms conveying descriptors of objects. In some examples, personal training is used to train the neural network using custom training samples provided by the user.

While the query interpreter 150 is performing the query interpretation to identify the descriptor 152 of the objects 50, the visual feature recognizer 160 may extract visual features 162 from the received image data 122 to obtain object recognition results 166 each characterizing a corresponding object 50 detected in the image data 122. Additionally, the visual feature recognizer 160 may also extract textual or symbolic features 164 from the received image data for use in obtaining the object recognition results 166. For instance, while the two bottles 50a, 50b may be sized and shaped identically, the bottles 50a, 50b may include product labels having textual features indicating that one bottle is shampoo and the other is conditioner. Accordingly, the visual feature recognizer 160 may combine the visual features 162 and the textual features 164 extracted from the image data to obtain more accurate/robust object recognition results 166. The visual feature recognizer 160 may include a neural network trained using machine learning to identify objects based on visual features 162 and/or textual/symbolic features 164 extracted from image data. In some examples, personal training is used to train the neural network using custom training samples provided by the user.

In order to identify the one or more objects referred to by the query 118, the digital assistant 105 may then determine an association between one or more of the object recognition results 166 and the descriptor 152 of the one or more objects conveyed by the one or more terms identified in the query 118. In the example, performing query interpretation on the query 118 "which bottle is shampoo?" would identify the term "bottle" as the descriptor 152 for an object category associated with the objects 50. As such, the digital assistant

105 may determine the association between the descriptor 152 of the term bottle and any visual features 162 extracted from the image data 122 that are characteristic of the bottle object class to identify the two objects 50*a*, 50*b* as the one or more objects referred to by the query 118.

The query interpreter 150 may be further configured to process the query 118 to determine the insights associated with the identified one or more objects 50 for the digital assistant 105 to discern by performing query interpretation (i.e., semantic interpretation) on the transcription 132 of the query 118 to identify one or more types of insights for the digital assistant 105 to discern. Here, the query interpreter 150 may be trained on training queries that each include a phrase paired with a corresponding label indicating the type of insight. For example, the types of insights may include, without limitation, an insight to uniquely identify a single object (e.g., responsive to the "what is this?"), an insight to identify multiple related objects (e.g., responsive to the query "what spices do I need for my buffalo wild wing rub?"), an insight to obtain additional information about an object (e.g., responsive to the query "what is this for?" or responsive to the query "tell me the dosing information"), an insight to provide personalized information about an object (e.g., responsive to the query "what is William's dose for this medicine"?), an insight to distinguish between two or more objects (e.g., responsive to the query "which bottle is shampoo?"), or an insight to enhance available information associated with the object (e.g., responsive to the query "what do the instructions say on the label?").

After processing the query 118 and the image data 122 to identify the one or more objects and determine the insights associated with the identified one or more objects 50 for the digital assistant 105 to discern, the digital assistant 105 may perform one or more operations to discern the insights associated with the identified one or more objects. In the example of FIG. 1, based on identifying the two bottles 50*a*, 50*b* as the one or more objects 50 referred to by the query 118 and identifying that the type of insight requested by the query 118 for the digital assistant 105 to discern includes an insight to distinguish between two or more objects, the digital assistant 105 may perform operations that include instructing the visual feature recognizer 160 to extract textual or symbolic features 164 from the image data 122 to obtain object identifiers that uniquely identifies the first object 50*a* as shampoo and the second object 50*b* as conditioner. For instance, textual features 164 extracted from the image data 122 may be extracted from both a product label 56 disposed on the bottle 50*a* that includes the Arabic word for "shampoo" and a product label 56 disposed on the bottle 50*b* that includes the Arabic word for "conditioner". By using textual (or symbolic) features 164 extracted from the image data 122, the digital assistant is able to uniquely identify each of the objects 50*a*, 50*b* as shampoo and conditioner, respectively, despite the visual features 162 indicating that the objects correspond to two identically-sized and shaped bottles. The content generator 180 may translate the Arabic text indicated by the textual features 164 into the English word "shampoo" based on determining a profile for the user in an enrolled user data store 194 speaks English as a native language. Thereafter, the content generator 180 may generate and overlay a graphical element 202 for display in the GUI 200 upon the object 50*a* to indicate the object 50*a* is shampoo.

Similarly, in the example of FIG. 2B where the digital assistant 105 identifies the object 50*b* on the right as the object referred to by the query 118 "what is this?", the digital assistant 105 may instruct to visual feature recognizer 160 to extract visual features 162 and/or textual features 164 from the image data 122 to obtain an object recognition result 166 that uniquely identifies the object 50*b* as conditioner. The visual features 162 may be associated with the shape and size of a personal hygiene bottle (shampoo or conditioner). The textual features 164 may be associated with a product label 56 of the bottle that includes the Arabic word for "conditioner". The content generator 180 may translate the Arabic text indicated by the textual features 164 into the English word "conditioner" to effectively discern the insight for informing the user 102 that the object 50*b* next to the hand 51 is conditioner. Thus, the content generator 180 may generate and overlay a graphical element 202 for display in the GUI 200 upon the object 50*b* to indicate the object 50*b* is conditioner.

While the examples of FIGS. 1, 2A, and 2B described above depict the visual feature recognizer 160 extracting textual or symbolic features 164 related to product labels 56 for use in discerning the insight to convey that the objects include shampoo and conditioner, the digital assistant 105 is capable of uniquely identifying particular objects without extracting textual features 164. This may be particularly useful when there are no textual features 164 associated with the object or there are no textual features to extract because a product label is torn off or the text is worn out. In such scenarios, the extracted visual features 162 may indicate colors of the detected objects to differentiate similarly shaped/sized objects. For instance, in the example of FIG. 1, the visual feature recognizer 160 may extract visual features 162 indicating that the object 50*a* is blue and that the object 50*b* is white. The digital assistant 105 may then query a search engine 190 for search results containing product information and determine that blue bottles are associated with shampoo while white bottles are associated with conditioner.

Figure 2C:
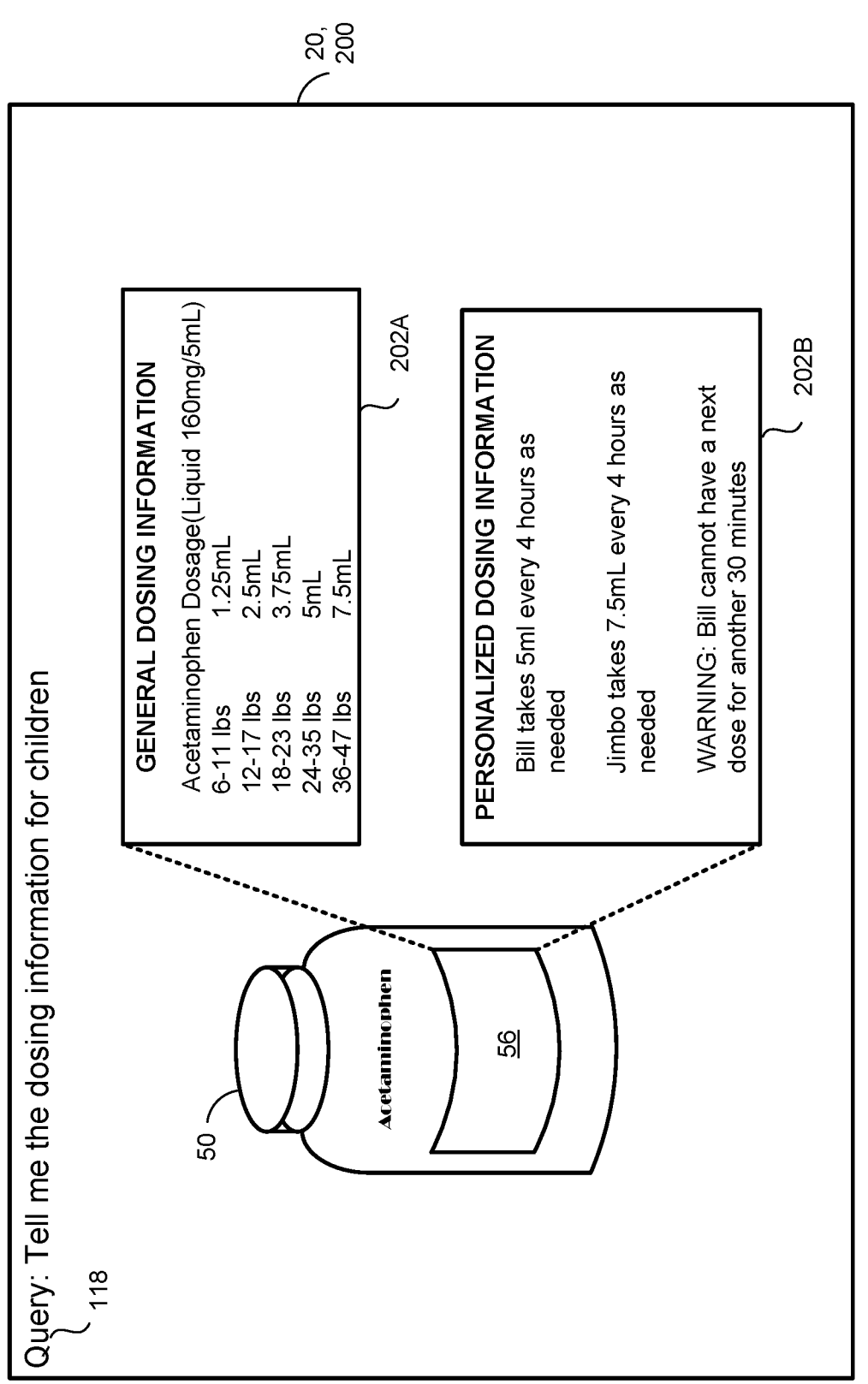

FIG. 2C shows an example GUI 200 displayed on the screen 20 of the user device 10 that depicts an object 50 detected in the image data 122 that corresponds to a bottle of Acetaminophen referred to by the query 118 "Tell me the dosing information for children?" In this example, the type of insight the query 118 requests the digital assistant 105 to discern includes an insight to obtain dosing information about the identified object corresponding to the medicine Acetaminophen. In some examples, the digital assistant 105 queries a search engine or a product datastore to retrieve a search result that provides general dosing information published by a manufacturer of the medicine. Additionally or alternatively, the digital assistant 105 may extract textual features 164 from a product label 56 disposed on the object 50 to discern the general dosing information for children that is listed on the product label 56.

The content generator 180 may generate a graphical element 202A for display in the GUI 200 adjacent to the bottle 50 to convey the discerned insight that provides the user with the general dosing information for children that lists doses for different ranges of body weights. Notably, the content generator 180 may provide the ability to enhance available information by extracting text from a product label and generating a graphic that conveys the extracted text from the label in larger and easier to read font. Alternatively, in some instances, merchants could have the ability to upload textual data from their product labels to permit the content generator 180 to simply display the uploaded text for graphical display in the GUI rather than requiring the content generator 180 to extract text from a captured image of a product label and then generate the graphical element 202A that enhances the information/text on the label.

In some additional examples, the digital assistant 105 discerns a customized/personalized insight associated with the user 102. In the example of FIG. 2C, the digital assistant 105 may access a user profile for the user from the enrolled user datastore 194 that personalized dosing information for the user's 102 children Bill and Jimbo. The user 102 (or a healthcare provider of Bill and Jimbo) may have previously input the personalized dosing information for Bill and Jimbo. Alternatively, the profile may simply indicate that Bill and Jimbo are the user's children and include the weight for each of Bill and Jimbo. Here, the content generator 180 may perform interpolation using the general dosing information and the weights of Bill and Jimbo to discern the personalized/customized dosing information for Bill and Jimbo. The content generator 180 may generate a graphical element 202B for display in the GUI 200 adjacent to the bottle 50 to convey the discerned insight that provides the user with the personalized dosing information for each of the user's 102 children, Bill and Jimbo, that indicates the number of dosing units (in mL) that Bill and Jimbo can each take every four (4) hours as needed.

In some examples, the digital assistant discerns additional customized/personal insights that may be beneficial for the user 102 based on the context of the query 118 issued by the user 102. In the example of FIG. 2C, the digital assistant 105 may reference historical information such as a time-stamped dosing log indicating each time a dose of a particular medicine was administered to one of the children, Bill and Jimbo. Here, the user 102 may have issued the query "Tell me the dosing information for children" less than four (4) hours since Bill last administered a dose of Acetaminophen. Since Bill's personalized dosing information indicates that consecutive doses must be separated by four hours, the content generator 180 may generate a warning message, "WARNING: Bill cannot have a next dose for another 30 minutes."

Figure 2D:
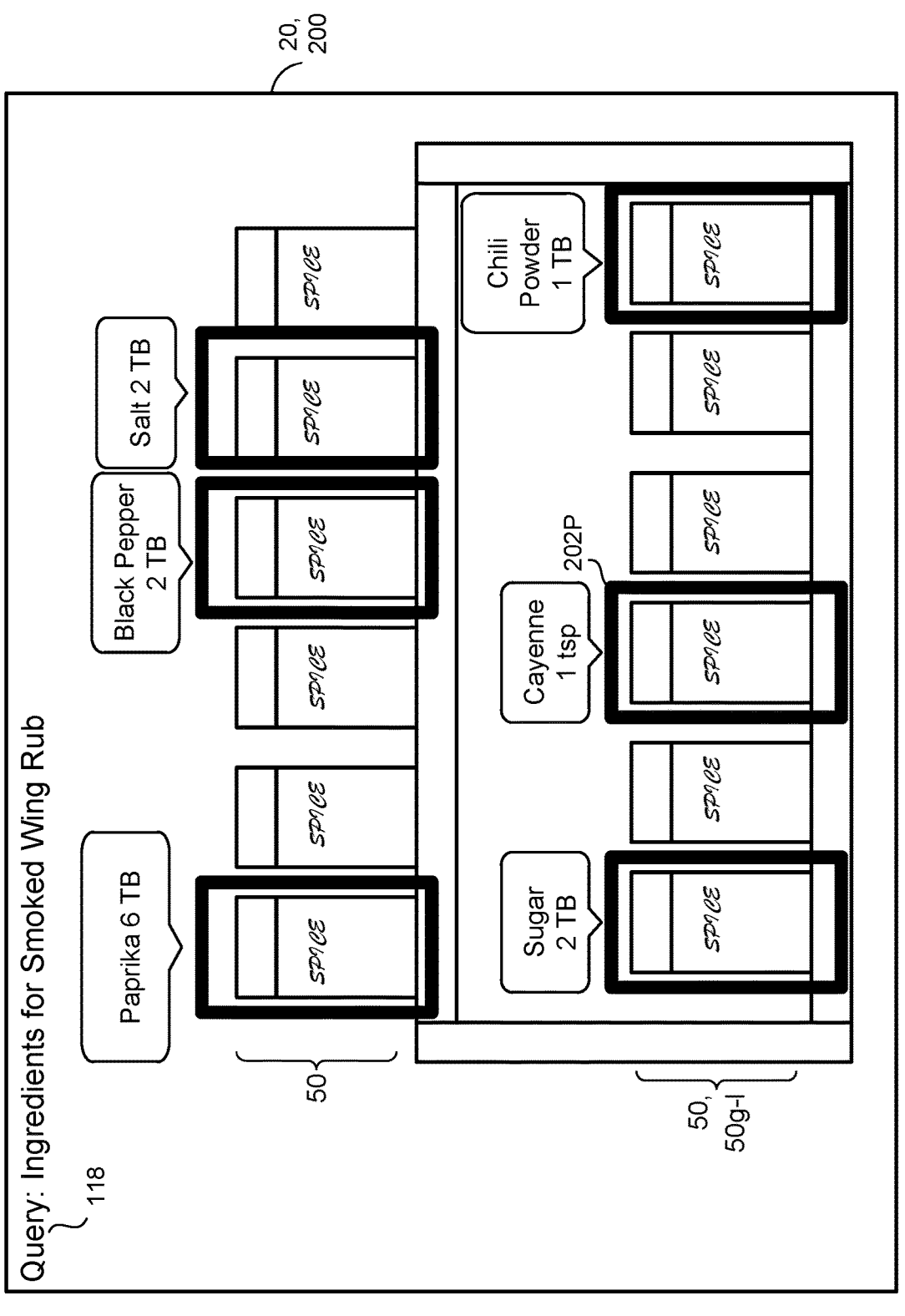

FIG. 2D shows an example GUI 200 displayed on the screen 20 of the user device 10 that depicts multiple objects 50 detected in the image data 122 that corresponds to spices arranged on a user's spice rack that are referred to by the query 118, "Ingredients for Smoked Wing Rub?". In this example, the type of insight the query 118 requests the digital assistant 105 to discern includes an insight to identify multiple related objects 50, e.g., identify all objects representing spices required for a smoked wing rub recipe. In this example, the "Smoked Wing Rub" referenced in the query 118 may refer to a custom recipe previously input by the user that includes a list of spices and a corresponding amount of each spice required to make a serving of rub to apply to chicken wings to be smoked. Alternatively, the recipe may be a published recipe posted on a webpage or software application that the digital assistant may retrieve.

Using any combination of the various techniques above, the digital assistant may uniquely identify each object 50 detected in the image data 122 that represents one of the spices in the list of spices for the smoked wing rub recipe. Moreover, the digital assistant may obtain additional information for each of the identified spices that indicates a respective proportion/amount of the identified spice to include in the smoked wing rub recipe. For each object 50 identified as representing one of the spices, the content generator 180 may generate a graphical element 202 that surrounds, or in someway enhances the object to facilitate easy recognition by the user, as well as a pop-up graphical element 202P that indicates the proportion/amount of the spice specified by the recipe. In some examples, once the user grasps and removes the spice bottle from the spice rack, the content generator may remove the graphical element surrounding the spice but maintain the pop-up graphical element 202P since the user still needs to add the required proportion/amount to a mixture of all the spices specified by the recipe. In this fashion, the content generator 180 may dynamically register the pop-up graphical element 202P displayed in the GUI 200 to track movements by the corresponding object 50.

Figures 3A, 3B:
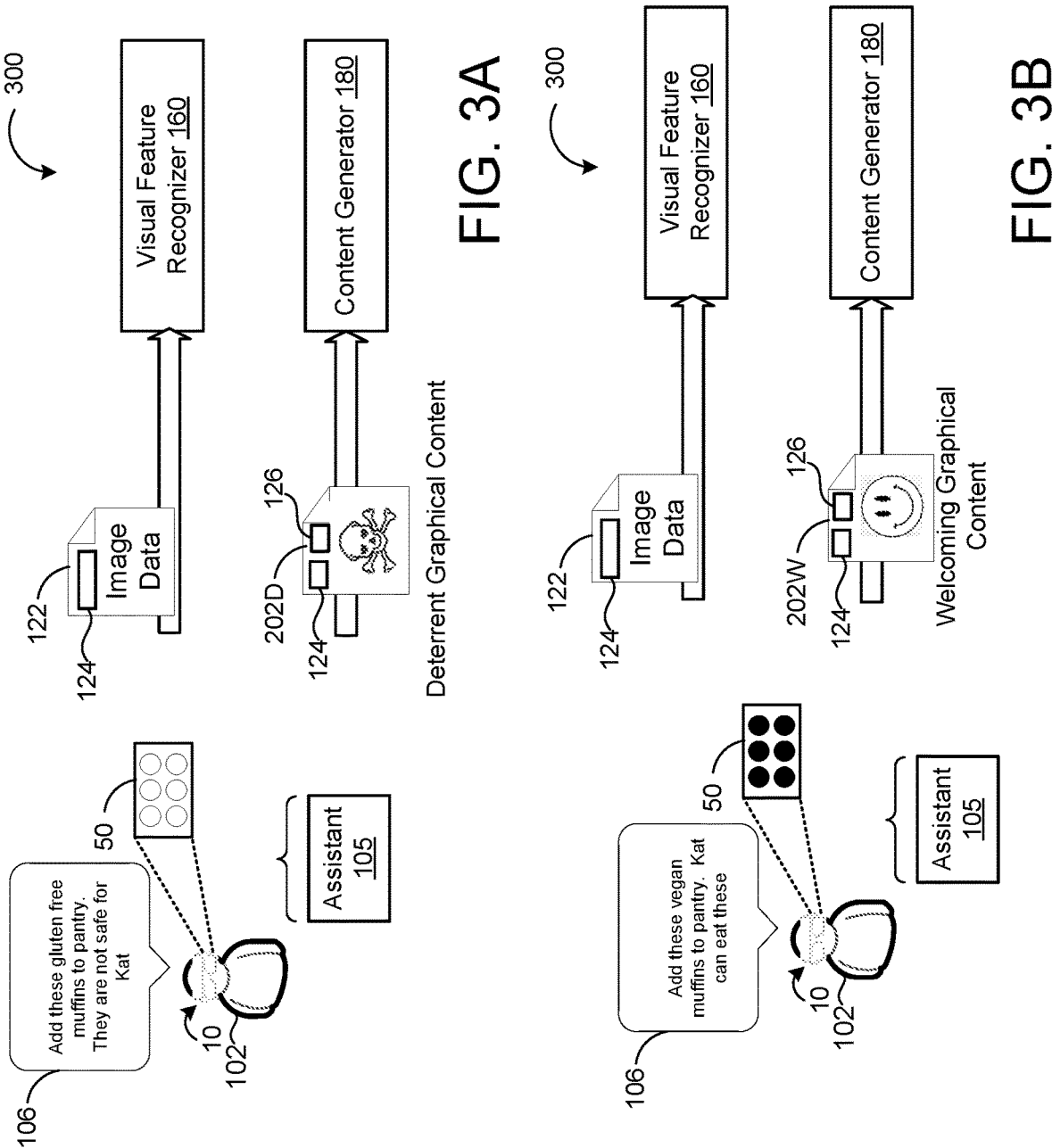
FIGS. 3A and 3B are schematic views of an example personalized training process for training a visual feature recognizer and a content generator to identify particular objects in image data and generate graphical content in response to identifying the particular objects.

FIGS. 3A and 3B show an example personalized training process 300 for training the visual feature recognizer 160 to recognize/identify specific objects and the content generator 180 to generate personalized graphical content 202 based on the discerned results and optionally a particular user issuing a query 118. In the example shown, the user 102 is the parent of Kat, who is allergic to dairy. The user 102 is undertaking the personalized training process 300 to teach the visual feature recognizer 160 to not only recognize particular food items the user 102 is adding to the pantry of the user's household, but also to identify whether or not these food items are safe for Kat to eat. The user 102 may use the user device 10 (e.g., smart glasses worn by the user) to capture image data 122 of an object 50 representing a particular food item the user 102 is adding to the pantry. The user 102 may speak an utterance 106 directed toward the digital assistant 105 that uniquely identifies the food item represented by the object 50 in the captured image data 122 and indicates whether or not the food item is safe for Kat to consume. While the examples of FIGS. 3A and 3B depict the user speaking an utterance 106 that may be recognized and converted to text (e.g., via the ASR model 130), the user 102 may also be free to enter textual inputs via the user device 10 to indicate the food item and label the food item as either being safe or unsafe for Kat to consume.

In FIG. 3A, the image capture device 120 (FIG. 1) captures image data 122 of an object 50 representing a package of gluten free muffins that contain dairy. The user 102 speaks the utterance 106 "Add these gluten free muffins to pantry. They are not safe for Kat." The utterance 106 could be also include a particular hotword or key phrase to trigger the digital assistant 105. The digital assistant 105 identifies that the object 50 captured in the image data 122 is associated with the food item "gluten free muffins" conveyed in the utterance 106 spoken by the user 102. The training process 300 trains the visual feature recognizer 160 on a training example that includes the image data 122 labeled with an item identifier 124 that uniquely identifies the object 50 as "gluten free muffins". Here, the visual feature recognizer 160 extracts visual and/or textual features 162, 164 from the image data 122 and is trained to predict an output recognizing that the object 50 within the image data 122 includes the "gluten free muffins".

The training process 300 also trains the content generator 180 to generate personalized graphical content 202 for Kat when queries 118 are issued indicating whether or not a food item is safe for Kat to eat. Still referring to FIG. 3A, based on the utterance 106 including the phrase, "They are not safe for Kat", the training process 300 trains the digital assistant 105 to learn that the object 50 identified as "gluten free muffins" in the image data 122 is not safe for Kat to consume. Accordingly, the training process 300 trains the content generator 180 to generate deterrent graphical content 202D when the visual feature recognizer 160 identifies/ classifies an object 50 as the "gluten free muffins" responsive to a query 118 issued indicating whether or not a food item is safe for Kat to consume. For instance, Kat could speak "Am I allergic to these muffins" or "Which muffins can I eat". Alternatively, Kat's parent could speak "Which muffins are for Kat". Thus, the training process 300 provides, as input to the content generator 180, a training sample that includes the deterrent graphical content 202D labeled with the item identifier 124 uniquely identifying "gluten free muffins" and a user identifier 126 identifying Kat. As used herein, providing the deterrent graphical content 202D may include the user 102 providing data that includes the deterrent graphical content 202D or may include the user 102 providing some identifier that identifies the deterrent graphical content 202D for the content generator 180 to generate.

In FIG. 3B, the image capture device 120 (FIG. 1) captures image data 122 of an object 50 representing a package of vegan muffins. The user 102 speaks the utterance 106 "Add these vegan muffins to pantry. Kat can eat these." The digital assistant 105 identifies that the object 50 captured in the image data 122 is associated with the food item "vegan muffins" conveyed in the utterance 106 spoken by the user 102. The training process 300 trains the visual feature recognizer 160 on a training example that includes the image data 122 labeled with an item identifier 124 that uniquely identifies the object 50 as "vegan muffins". Here, the visual feature recognizer 160 extracts visual and/or textual features 162, 164 from the image data 122 and is trained to predict an output recognizing that the object 50 within the image data 122 includes the "vegan muffins".

The training process 300 also trains the content generator 180 to generate personalized graphical content 202 for Kat when queries 118 are issued indicating whether or not a food item is safe for Kat to eat. Still referring to FIG. 3B, based on the utterance 106 including the phrase, "Kat can eat these", the training process 300 trains the digital assistant 105 to learn that the object 50 identified as "vegan muffins" in the image data 122 is safe for Kat to consume. Accordingly, the training process 300 also trains the content generator 180 to generate welcoming graphical content 202W when the visual feature recognizer 160 identifies/classifies an object 50 as the "vegan muffins" responsive to a query 118 issued that indicates whether or not the items are safe for Kat to consume. For instance, Kat could speak "Am I allergic to these muffins" or "Which muffins are safe for me". Alternatively, Kat's parent could speak "Which muffins are for Kat". Thus, the training process 300 provides, as input to the content generator 180, a training sample that includes the welcoming graphical content 202W labeled with the item identifier 124 uniquely identifying "vegan muffins" and a user identifier 126 identifying Kat. For example, the welcoming graphical content 202W could include a smiley face. As used herein, providing the welcoming graphical content 202W may include the user 102 providing data that includes the welcoming graphical content 202W or may include the user 102 providing some identifier that identifies the welcoming graphical content 202W for the content generator 180 to generate.

FIG. 4 is a flowchart of an example arrangement of operations for a method 400 of generating content 202 that indicates discerned insights associated with one or more objects identified in image data 122 captured by an image capture device 120. The method 400 may include a computer-implemented method that executes on data processing hardware 510 (FIG. 5) that may reside on a user device 10 or a remote server 80 in communication with the user device 10. The data processing hardware 510 may execute instructions stored on memory hardware 520 (FIG. 5) to perform the operations for the method 400. The memory hardware 520 may reside on the user device 10 or the remote server 80.

At operation 402, the method 400 includes receiving, from the image capture device 120 in communication with the data processing hardware 510, image data 122 for an area of interest of a user 102. At operation 404, the method 400 includes receiving a query 118 from the user 102 referring to one or more objects 50 detected within the image data 122 and requesting a digital assistant 105 to discern insights associated with the one or more objects 50 referred to by the query 118.

At operation 406, the method 400 includes processing the query 118 and the image data 122 to: identify, based on context data 142 extracted from the image data 122, the one or more objects 50 referred to by the query 118; and determine the insights associated with the identified one or more objects 50 for the digital assistant 105 to discern. At operation 408, the method 400 also includes generating, for output from a user device 10 associated with the user 102, content 202 indicating the discerned insights associated with the identified one or more objects 50.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
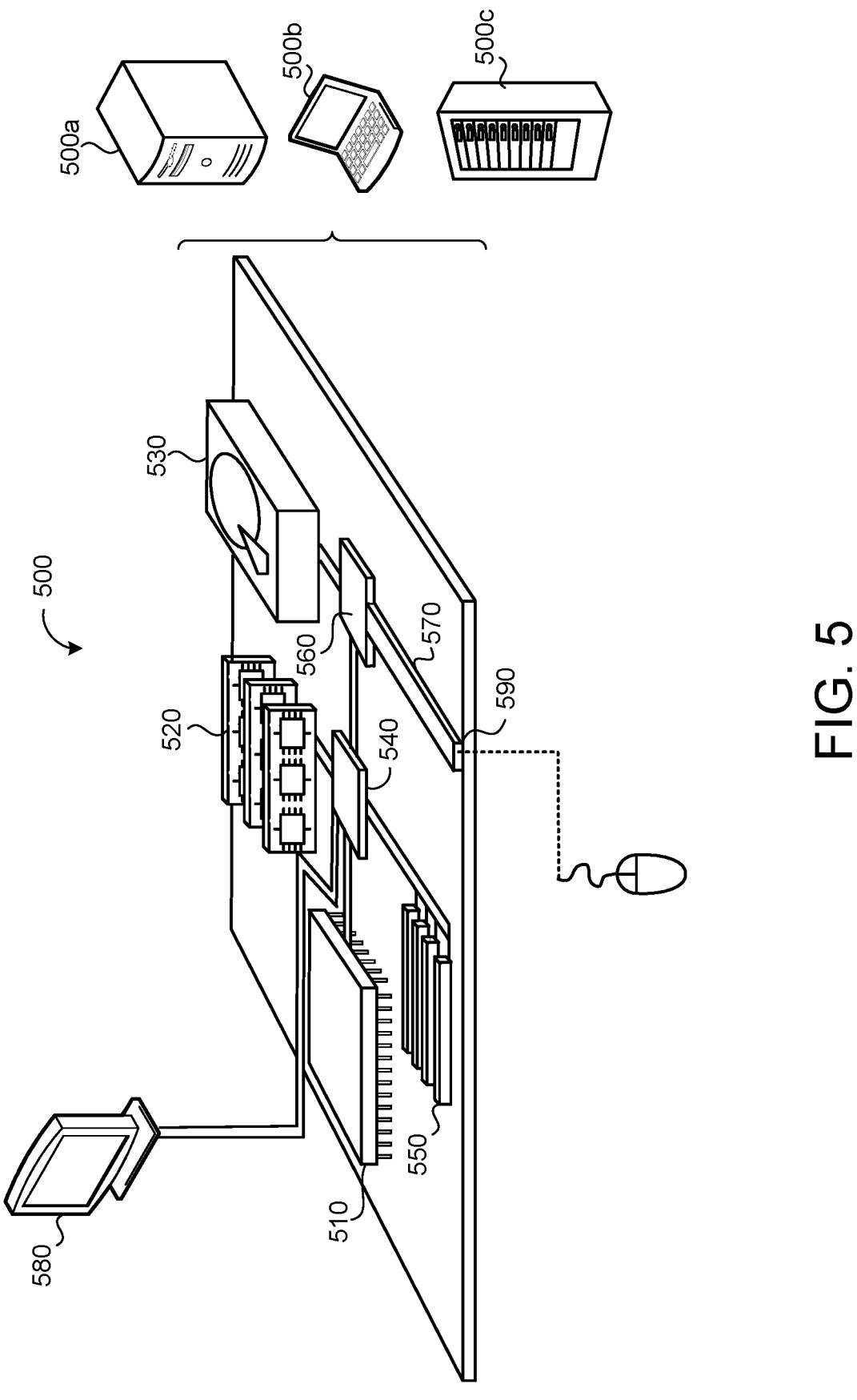
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 may include the data processing hardware 12 of the user device 10 or data processing hardware of the server 80. The data processing hardware 510 can process instructions for execution within the computing device 500, including instructions stored in the memory 520 or on the storage device 530 to display graphical information for a graphical user interface (GUI) on an external input/output device, such as display 580 coupled to high speed interface 540. The memory 520 may include the memory hardware 14 of the user device 10 or memory hardware residing on the server 80. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that when executed on data processing hardware causes the data processing hardware to perform operations comprising:

executing a training process to train a content generator on a plurality of training samples to teach the content generator to learn to generate personalized graphical content when particular objects associated with user-defined insight are uniquely identified in image data, each training sample comprising:

a corresponding ground-truth label uniquely identifying one of the particular objects;

a corresponding user-defined insight associated with the particular object; and data representing the personalized graphical content to generate that is graphically representative of the corresponding user-defined insight associated with the particular object;

receiving, from an image capture device in communication with the data processing hardware, image data for an area of interest of a user;

receiving a query from the user referring to one or more objects detected within the image data and requesting a digital assistant to discern insights associated with the one or more objects referred to by the query, wherein the query refers to, but does not explicitly identify, the one or more objects associated with the insights the digital assistant is requested to discern;

processing the query and the image data to:

identify, based on context data extracted from the image data, the one or more objects referred to by the query;

determine that one of the identified one or more objects corresponds to the particular object of one of the plurality of training samples; and determine the insights associated with the identified one or more objects for the digital assistant to discern; and generating, for output from a user device associated with the user, using the trained content generator, the personalized graphical content that is graphically representative of the corresponding user-defined insight associated with the particular object.

2. The computer-implemented method of claim 1, wherein:

the context data extracted from the image data comprises a hand of the user recognized within the image data; and processing the query and the image data to identify the one or more objects comprises processing the query and the image data to identify the one or more objects based on a proximity of the hand of the user recognized within the image data to at least one of the one or more objects detected within the image data.

3. The computer-implemented method of claim 1, wherein:

the context data extracted from the image data comprises a point of focus of the image capture device; and processing the query and the image data to identify the one or more objects referred to by the query comprises processing the query and the image data to identify the one or more objects based on locations of the one or more objects detected within the image data relative to the point of focus of the image capture device.

4. The computer-implemented method of claim 1, wherein processing the query and the image data to identify the one or more objects associated with the insights comprises:

performing query interpretation on the received query to identify one or more terms conveying a descriptor of the one or more objects referred to by the query;

extracting visual features from the received image data to obtain object recognition results;

determining an association between one or more of the object recognition results and the descriptor of the one or more objects; and identifying the one or more objects referred to by the query based on the association between one or more of the object recognition results and the descriptor of the one or more objects.

5. The computer-implemented method of claim 4, wherein the operations further comprise:

extracting textual features from the received image data; and combining the textual features extracted from the received image data with the visual features extracted from the received image data to obtain the object recognition results.

6. The computer-implemented method of claim 4, wherein the descriptor conveyed by the one or more terms identified by performing the query interpretation on the received query comprises at least one of:

an object category associated with the one or more objects;

a physical trait associated with the one or more objects; or a location of the one or more objects relative to reference object in the field of view of the image data.

7. The computer-implemented method of claim 1, wherein processing the query and the image data to determine the insights associated with the identified one or more objects for the digital assistant to discern comprises performing query interpretation on the received query to identify a type of the insight for the digital assistant to discern.

8. The computer-implemented method of claim 7, wherein the type of insight identified for the digital assistant to discern comprises at least one of:

an insight to uniquely identify a single object;

an insight to identify multiple related objects;

an insight to obtain additional information about an object;

an insight to provide personalized information about an object;

an insight to distinguish between two or more objects; or an insight to enhance available information.

9. The computer-implemented method of claim 1, wherein the operations further comprise, after processing the query and the image data to identify the one or more objects and determine the insights associated with the identified one or more objects for the digital assistant to discern:

performing one or more operations to discern the insights associated with the identified one or more objects; and generating, for output from a user device associated with the user, content indicating the discerned insights associated with the identified one or more objects based on the one or more operations performed to discern the insights.

10. The computer-implemented method of claim 9, wherein performing the one or more operations to discern the insights comprise at least one of:

extracting, from the image data, textual features containing detailed product information associated with at least one of the identified one or more objects;

extracting, from the image data, textual features containing an object identifier that uniquely identifies at least one of the identified one or more objects;

retrieving search results containing product information associated with at least one of the identified one or more objects;

retrieving textual data containing product information associated with at least one of the identified one or more objects, the textual data uploaded by a merchant;

retrieving personal information associated with at least one of the identified one or more objects; or retrieving custom information associated with at least one of the identified one or more objects.

11. The computer-implemented method of claim 1, wherein the operations further comprise:

generating, for output from a user device associated with the user, content indicating the discerned insights associated with the identified one or more objects; and generating graphical content that indicates the discerned insights wherein the graphical content is superimposed in a graphical user interface displayed on a screen of the user device.

12. The computer-implemented method of claim 1, wherein the operations further comprise:

generating, for output from a user device associated with the user, content indicating the discerned insights associated with the identified one or more objects; and generating audible content indicating the discerned insights, wherein the audible content is audibly output from the user device.

13. The computer-implemented method of claim 1, wherein executing the training process to train the content generator on the plurality of training samples further comprises training a visual feature recognizer on the plurality of training samples to teach the visual feature recognizer to learn to uniquely identify particular objects, each training sample further comprising corresponding training image data representing the particular object.

14. A system comprising:

data processing hardware; and memory hardware in communication with the data processing hardware, the memory hardware storing instructions that when executed on the data processing hardware cause the data processing hardware to perform operations comprising:

executing a training process to train a content generator on a plurality of training samples to teach the content generator to learn to generate personalized graphical content when particular objects associated with user-defined insight are uniquely identified in image data, each training sample comprising:

a corresponding ground-truth label uniquely identifying one of the particular objects;

a corresponding user-defined insight associated with the particular object; and data representing the personalized graphical content to generate that is graphically representative of the corresponding user-defined insight associated with the particular object;

receiving, from an image capture device in communication with the data processing hardware, image data for an area of interest of a user;

receiving a query from the user referring to one or more objects detected within the image data and requesting a digital assistant to discern insights associated with the one or more objects referred to by the query, wherein the query refers to, but does not explicitly identify, the one or more objects associated with the insights the digital assistant is requested to discern;

processing the query and the image data to:

identify, based on context data extracted from the image data, the one or more objects referred to by the query;

determine that one of the identified one or more objects corresponds to the particular object of one of the plurality of training samples; and determine the insights associated with the identified one or more objects for the digital assistant to discern; and generating, for output from a user device associated with the user, using the trained content generator, the personalized graphical content that is graphically representative of the corresponding user-defined insight associated with the particular object.

15. The system of claim 14, wherein:

the context data extracted from the image data comprises a hand of the user recognized within the image data; and processing the query and the image data to identify the one or more objects comprises processing the query and the image data to identify the one or more objects based on a proximity of the hand of the user recognized within the image data to at least one of the one or more objects detected within the image data.

16. The system of claim 14, wherein:

the context data extracted from the image data comprises a point of focus of the image capture device; and processing the query and the image data to identify the one or more objects referred to by the query comprises processing the query and the image data to identify the one or more objects based on locations of the one or more objects detected within the image data relative to the point of focus of the image capture device.

17. The system of claim 14, wherein processing the query and the image data to identify the one or more objects associated with the insights comprises:

performing query interpretation on the received query to identify one or more terms conveying a descriptor of the one or more objects referred to by the query;

extracting visual features from the received image data to obtain object recognition results;

determining an association between one or more of the object recognition results and the descriptor of the one or more objects; and identifying the one or more objects referred to by the query based on the association between one or more of the object recognition results and the descriptor of the one or more objects.

18. The system of claim 17, wherein the operations further comprise:

extracting textual features from the received image data; and combining the textual features extracted from the received image data with the visual features extracted from the received image data to obtain the object recognition results.

19. The system of claim 17, wherein the descriptor conveyed by the one or more terms identified by performing the query interpretation on the received query comprises at least one of:

an object category associated with the one or more objects;

a physical trait associated with the one or more objects; or a location of the one or more objects relative to reference object in the field of view of the image data.

20. The system of claim 14, wherein processing the query and the image data to determine the insights associated with the identified one or more objects for the digital assistant to discern comprises performing query interpretation on the received query to identify a type of the insight for the digital assistant to discern.

21. The system of claim 20, wherein the type of insight identified for the digital assistant to discern comprises at least one of:

an insight to uniquely identify a single object;

an insight to identify multiple related objects;

an insight to obtain additional information about an object;

an insight to provide personalized information about an object;

an insight to distinguish between two or more objects; or an insight to enhance available information.

22. The system of claim 14, wherein the operations further comprise, after processing the query and the image data to identify the one or more objects and determine the insights associated with the identified one or more objects for the digital assistant to discern:

performing one or more operations to discern the insights associated with the identified one or more objects; and generating, for output from a user device associated with the user, content indicating the discerned insights associated with the identified one or more objects based on the one or more operations performed to discern the insights.

23. The system of claim 22, wherein performing the one or more operations to discern the insights comprise at least one of:

extracting, from the image data, textual features containing detailed product information associated with at least one of the identified one or more objects;

extracting, from the image data, textual features containing an object identifier that uniquely identifies at least one of the identified one or more objects;

retrieving search results containing product information associated with at least one of the identified one or more objects;

retrieving textual data containing product information associated with at least one of the identified one or more objects, the textual data uploaded by a merchant;

retrieving personal information associated with at least one of the identified one or more objects; or retrieving custom information associated with at least one of the identified one or more objects.

24. The system of claim 14, wherein the operations further comprise:

generating, for output from a user device associated with the user, content indicating the discerned insights associated with the identified one or more objects; and generating graphical content that indicates the discerned insights wherein the graphical content is superimposed in a graphical user interface displayed on a screen of the user device.

25. The system of claim 14, wherein the operations further comprise:

generating, for output from a user device associated with the user, content indicating the discerned insights associated with the identified one or more objects; and generating audible content indicating the discerned insights, wherein the audible content is audibly output from the user device.

26. The system of claim 14, wherein executing the training process to train the content generator on the plurality of training samples further comprises training a visual feature recognizer on the plurality of training samples to teach the visual feature recognizer to learn to uniquely identify particular objects, each training sample further comprising corresponding training image data representing the particular object.

\*   \*   \*   \*   \*